United States Patent
Hong et al.

(10) Patent No.: US 11,916,979 B2
(45) Date of Patent: Feb. 27, 2024

(54) SHARED CONTROL OF A REMOTE CLIENT

(71) Applicant: Zoom Video Communications, Inc., San Jose, CA (US)

(72) Inventors: Karen Kuei Ren Hong, San Jose, CA (US); Haibing Xu, Milpitas, CA (US); Dan Yang, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/509,863

(22) Filed: Oct. 25, 2021

(65) Prior Publication Data

US 2023/0125545 A1 Apr. 27, 2023

(51) Int. Cl.
| | |
|---|---|
| H04L 29/06 | (2006.01) |
| H04L 29/08 | (2006.01) |
| H04L 65/1104 | (2022.01) |
| H04L 65/1069 | (2022.01) |
| H04L 67/306 | (2022.01) |

(52) U.S. Cl.
CPC ...... *H04L 65/1104* (2022.05); *H04L 65/1069* (2013.01); *H04L 67/306* (2013.01)

(58) Field of Classification Search
CPC ............ H04L 65/1069; H04L 65/1083; H04L 65/1094; H04L 65/1095; H04L 65/1096; H04L 65/1101; H04L 65/1104
See application file for complete search history.

(56) References Cited

U.S. PATENT DOCUMENTS

| | | | |
|---|---|---|---|
| 6,571,094 B1 | 5/2003 | Begeja et al. | |
| 6,614,781 B1 | 9/2003 | Elliott et al. | |
| 8,456,507 B1 | 6/2013 | Mallappa et al. | |
| 8,582,565 B1 | 11/2013 | Morsy et al. | |
| 8,934,382 B2 | 1/2015 | Rodman et al. | |
| 9,119,136 B2* | 8/2015 | Venkatachalam | H04W 60/00 |
| 9,300,205 B2 | 3/2016 | Matsui | |
| 9,680,687 B2 | 6/2017 | Chappelle et al. | |
| 10,291,597 B2 | 5/2019 | Li et al. | |
| 10,516,705 B2 | 12/2019 | Barjonas et al. | |

(Continued)

FOREIGN PATENT DOCUMENTS

| | | |
|---|---|---|
| CN | 107959761 B | 6/2020 |
| CN | 115767834 A | 3/2023 |

(Continued)

OTHER PUBLICATIONS

How Does A Bluetooth Headset Work? From Jabra GN Website: https://www.jabra.com/fq/how-does-bluetooth-headset-work#:~:text=A%20Bluetooth%C2%AE%20device%20works,smartphones%2C%20laptops%20and%20portable%20speakers. (Year: 2023).*

(Continued)

*Primary Examiner* — Kostas J Katsikis

(74) *Attorney, Agent, or Firm* — Young Basile Hanlon & MacFarlane, P.C.

(57) ABSTRACT

A client is configured to control one or more functions of another client remotely via a wireless connection. Enabling control of the one or more functions of another client includes receiving a control command from a first client. The control command indicates a function to be performed by a second client. The control command is transmitted to the second client when a binding status indicates a binding between the first client to the second client.

20 Claims, 9 Drawing Sheets

(56) References Cited

U.S. PATENT DOCUMENTS

| | | | |
|---|---|---|---|
| 10,834,147 B1* | 11/2020 | Wehrung | H04L 67/025 |
| 11,233,870 B1* | 1/2022 | Gupta | H04L 63/102 |
| 2003/0137959 A1 | 7/2003 | Nebiker et al. | |
| 2003/0137991 A1 | 7/2003 | Doshi et al. | |
| 2004/0001479 A1 | 1/2004 | Pounds et al. | |
| 2004/0004942 A1 | 1/2004 | Nebiker et al. | |
| 2005/0138183 A1 | 6/2005 | O'Rourke et al. | |
| 2006/0013201 A1* | 1/2006 | Bettis | H04L 65/103 |
| | | | 370/352 |
| 2007/0248221 A1 | 10/2007 | Chatterjee et al. | |
| 2007/0250567 A1 | 10/2007 | Graham et al. | |
| 2007/0283142 A1 | 12/2007 | Milstein et al. | |
| 2008/0175230 A1 | 7/2008 | Brand et al. | |
| 2008/0219223 A1 | 9/2008 | Bienas et al. | |
| 2008/0219240 A1 | 9/2008 | Dylag et al. | |
| 2008/0232362 A1* | 9/2008 | Miyajima | H04L 65/1069 |
| | | | 370/389 |
| 2011/0164744 A1 | 7/2011 | Olshansky et al. | |
| 2011/0182281 A1 | 7/2011 | Siddique et al. | |
| 2012/0257566 A1* | 10/2012 | Le | H04L 45/308 |
| | | | 370/328 |
| 2013/0227149 A1 | 8/2013 | Athlur et al. | |
| 2014/0029474 A1 | 1/2014 | Bhagavatula et al. | |
| 2014/0218517 A1* | 8/2014 | Kim | H04N 21/41407 |
| | | | 348/143 |
| 2014/0270130 A1 | 9/2014 | Casalaina et al. | |
| 2014/0313998 A1 | 10/2014 | Sorescu | |
| 2015/0244979 A1 | 8/2015 | Andrada et al. | |
| 2015/0358580 A1 | 12/2015 | Zhou et al. | |
| 2016/0095141 A1 | 3/2016 | Ma et al. | |
| 2016/0294786 A1 | 10/2016 | Marquez Mendoza et al. | |
| 2017/0180484 A1* | 6/2017 | Asveren | H04L 61/2514 |
| 2018/0077260 A1* | 3/2018 | Faltyn | H04M 1/72451 |
| 2019/0082477 A1* | 3/2019 | Burton | H04M 1/6066 |
| 2019/0102049 A1 | 4/2019 | Anzures et al. | |
| 2019/0141096 A1 | 5/2019 | Rist et al. | |
| 2019/0245895 A1* | 8/2019 | Balasaygun | H04L 51/18 |
| 2020/0220977 A1 | 7/2020 | Ravichandran | |
| 2020/0252765 A1 | 8/2020 | Baker et al. | |
| 2021/0218836 A1 | 7/2021 | Alameh et al. | |
| 2021/0377345 A1 | 12/2021 | Li et al. | |

FOREIGN PATENT DOCUMENTS

| | | |
|---|---|---|
| EP | 1551164 A2 | 7/2005 |
| EP | 1968334 A2 | 9/2008 |
| EP | 3249940 | 11/2017 |
| WO | 2022231852 A1 | 11/2022 |

OTHER PUBLICATIONS

International Search Report and Written Opinion dated Aug. 23, 2022 in corresponding PCT Application Number PCT/US2022/024739.

International Search Report and Written Opinion dated Jul. 4, 2023 in corresponding PCT Application No. PCT/US2023/0190176.

* cited by examiner

SHARED CONTROL OF A REMOTE CLIENT

FIELD

This disclosure relates to the shared control of remote clients, such as those that may be used with software services implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
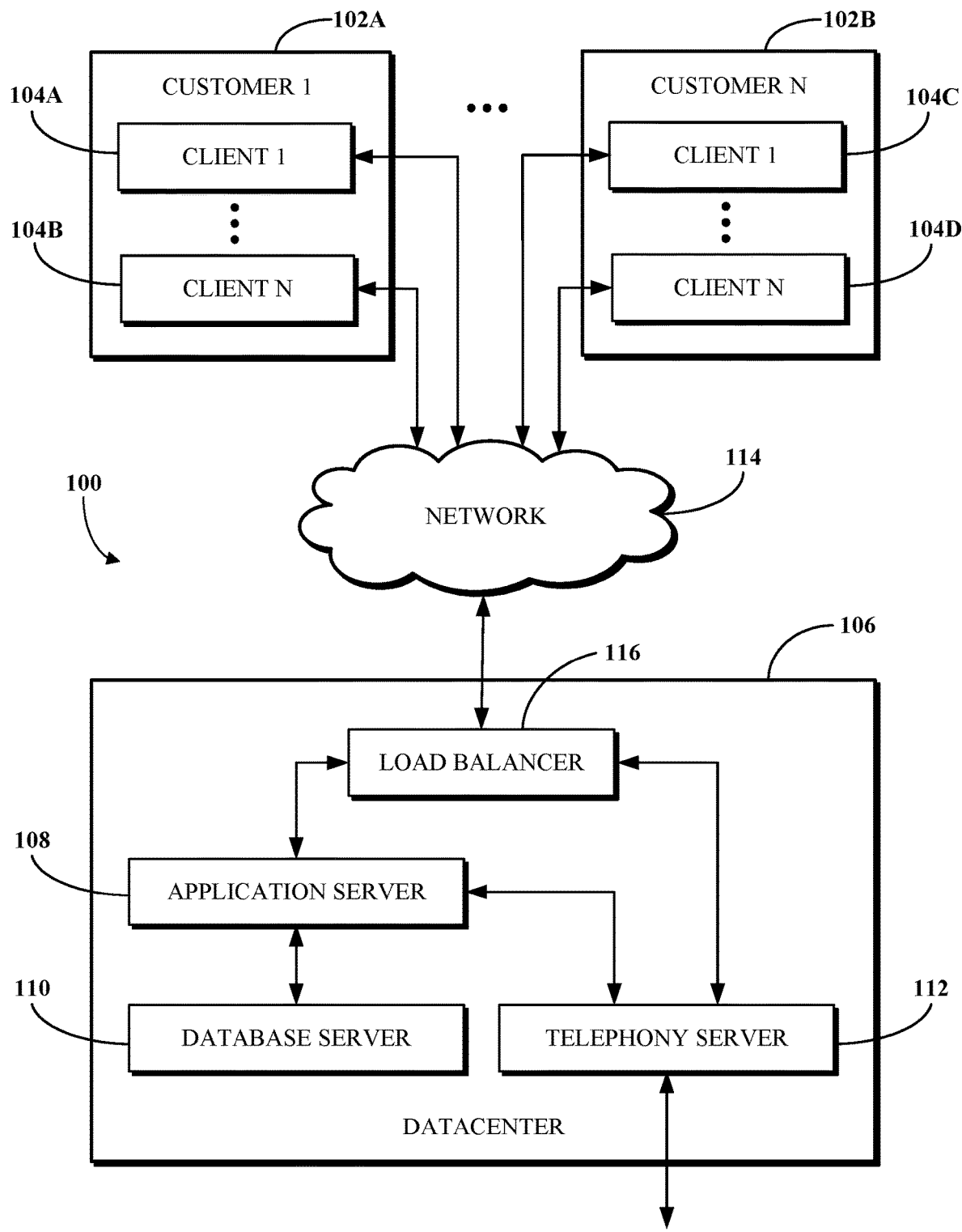
FIG. 1 is a block diagram of an example of an electronic computing and communications system.

A software platform, such as a Unified communications as a service (UCaaS) platform which includes several communications services integrated over a network (e.g., the Internet), may facilitate communications between multiple clients using telephony software and/or conferencing software. The telephony software and/or conferencing software may be configured to enable clients to control functions of other clients across the software platform. Users of clients may prefer the ease of use of a particular client to control one or more functions of another client. Typical clients use protocols that offer limited control functionality of other clients via a wired connection. For example, a desk phone may be directly connected via a wire to a desktop or laptop computer running a client application which may be used to control some basic functionality of the desk phone (e.g., volume control).

While wired connections may be useful in some cases, they are not without their conventional drawbacks. For example, bi-directional control and control of client functionality, such as call transfer or call merging, is generally not available via a wired connection using conventional approaches. In another example, certain controls such as the functional control of the desk phone described above may only be available at the connected device when a client application is running on that device and a wired connection exists between that device and the desk phone. Furthermore, it may not always be possible to have a wired connection between the desk phone and a computing device running a client application, such as when the client application is running on a mobile device. In these situations where a wired connection is not possible, conventional solutions for enabling a client to control a function of another client are not available.

Implementations of this disclosure address problems such as these using a shared control mode that does not require a direct wired connection between clients that use communication software, such as telephony software or conferencing software. These implementations enable bi-directional control to allow a client to control one or more functions of another client, and vice-versa, via a wireless connection between the clients. For example, with shared control mode, a system can enable a user to make and receive calls from a device using a client interface, while being logged into another device, such as a voice over internet protocol (VOIP) phone, where the client device and the other device share the same user account. In some examples, the shared control mode as disclosed herein may be implemented with cloud-based communication software. In some examples, the shared control mode as disclosed herein may be implemented with on-premises communication software.

To illustrate benefits of the implementations of this disclosure over conventional approaches, examples are presented of functionality of a client which would be desirable to control using another client. One example relates to a contact list, in which the contact list is searched on one client and a call is conducted on another client. Searching through a contact list using a desk phone can be cumbersome when the interface of the desk phone is limited (e.g., less usable than an interface of another client). For example, conventional desk phones have limited search capabilities, complicated menu structures, and an awkward input interface of condensed keypads that makes searching for a contact difficult. Using a shared control mode as disclosed herein, a user may efficiently search contacts on a first client, such as a mobile phone or a computer, select a contact on the first client, place a call to the selected contact using the first client, and conduct the call on a second client, such as the desk phone. Another example relates to a situation in which the volume of conference equipment of two or more conference rooms is too high and disturbing others on the premises. A shared control mode system may enable control of multiple clients from a remote client without a direct wired connection. For example, to reduce the noise from the conference equipment, a receptionist, or some other user, may adjust the volume of the conference equipment within the conference rooms from a client that is not directly connected via a wire to the conference equipment.

In some implementations, a client may control one or more functions of another client when the client and the other client do not share the same extension or are not associated with the same user account. For example, the client may be a conference room phone, and a binding may be created between the client and the other client even though they do not share the same extension. In some examples, the binding may be created by entering or scanning a device-specific code associated with the other client.

In some implementations, such as when a computer is used as an audio source for a conference, the shared control mode can be used to enable bi-directional control such that the volume buttons on a desk phone can be used to control the volume of the speakers of the computer. In some implementations, a client running on a computer can be used to change a desk phone setting, such as a ringtone or background image, for example.

In an example webinar implementation, a client may be enabled to control one or more functions of a camera using shared control mode. For example, the client may be a mobile device that can be used to control a zoom function of a standalone camera attached to the wall.

In an example hybrid conference implementation where some conference participants are meeting in person, and some participants are attending the conference virtually, a virtual attendee may control a device in the conference room using shared control mode. For example, the device may be a robotic arm or a printer that is configured to draw on a physical whiteboard in the conference room.

To describe some implementations in greater detail, reference is first made to examples of hardware and software structures used to implement a system for shared control of a remote client. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client is or refers to a client device, the client can comprise a robotic device, which can include one or more robotic arms, one or more appliances (e.g., room lighting devices to control a moveable spotlight, room ventilation devices to open/close one or more vents, or window shade devices to open/close one or more window shades) in a conference room, a vehicle (e.g., a delivery vehicle that can deliver food, beverages, and/or meeting supplies to the conference room), or a humanoid device (e.g., a humanoid assistant or receptionist). Where a client is or refers to a client device, the client can comprise an imaging device, such as a camera, a scanner, or a printing device (e.g., a printer). The camera may be a wall mounted camera or a camera mounted to an unmanned aerial vehicle (UAV). The UAV may be suitable for indoor and/or outdoor use. In some examples, the UAV may be attached to one or more cables and configured to traverse a defined area, such as a conference room, via the one or more cables. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
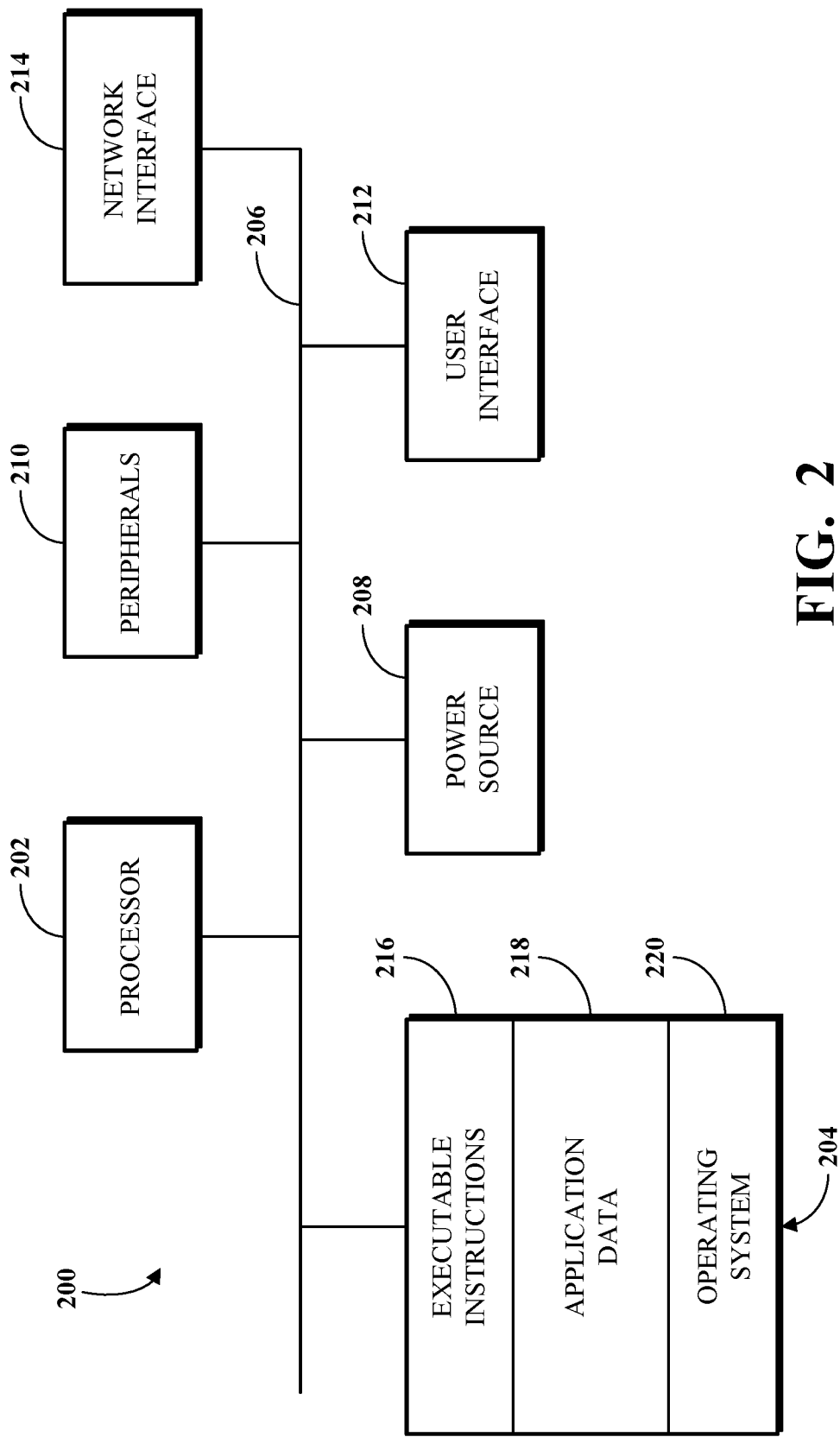
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
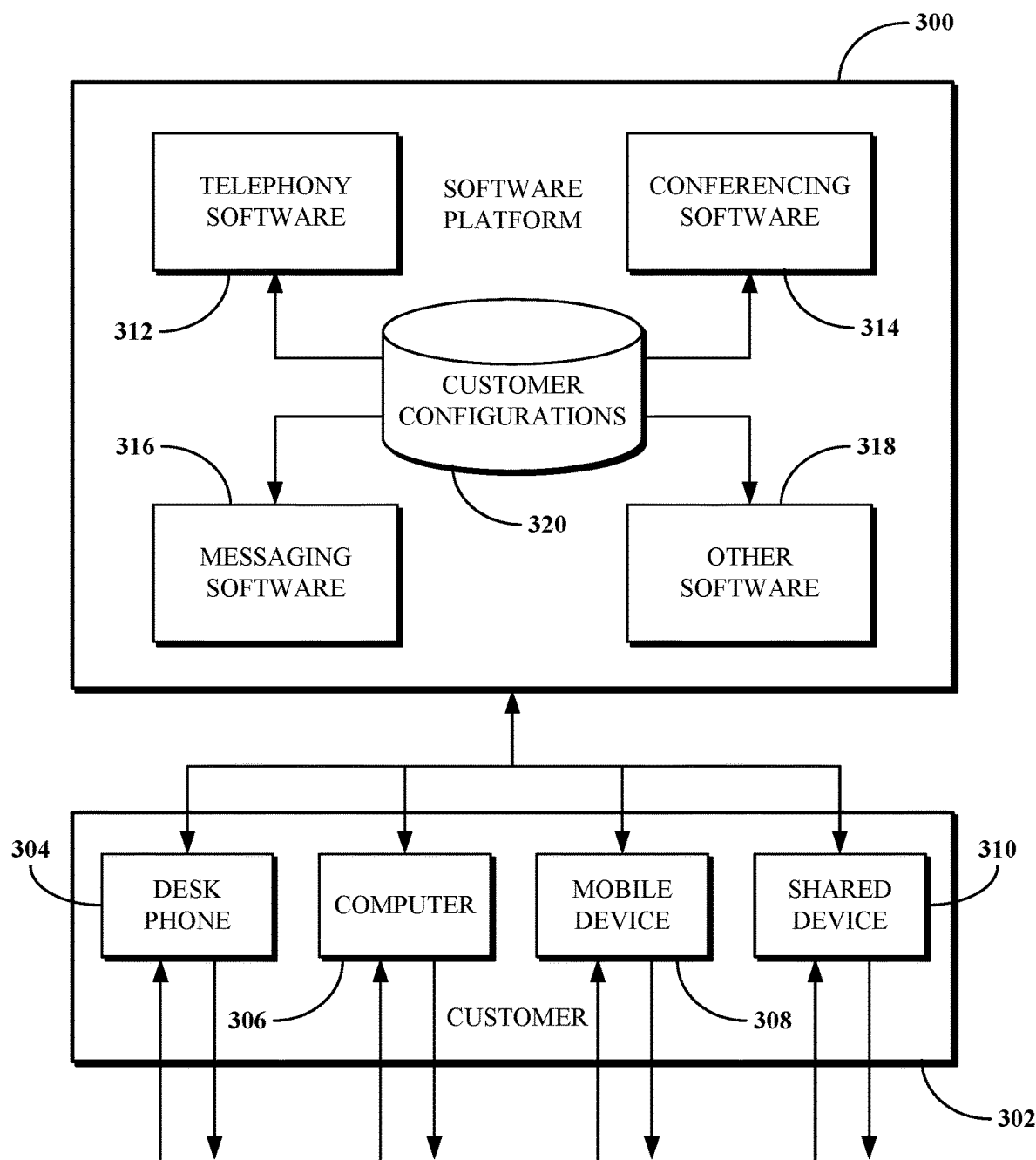
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality for shared control of a remote client.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
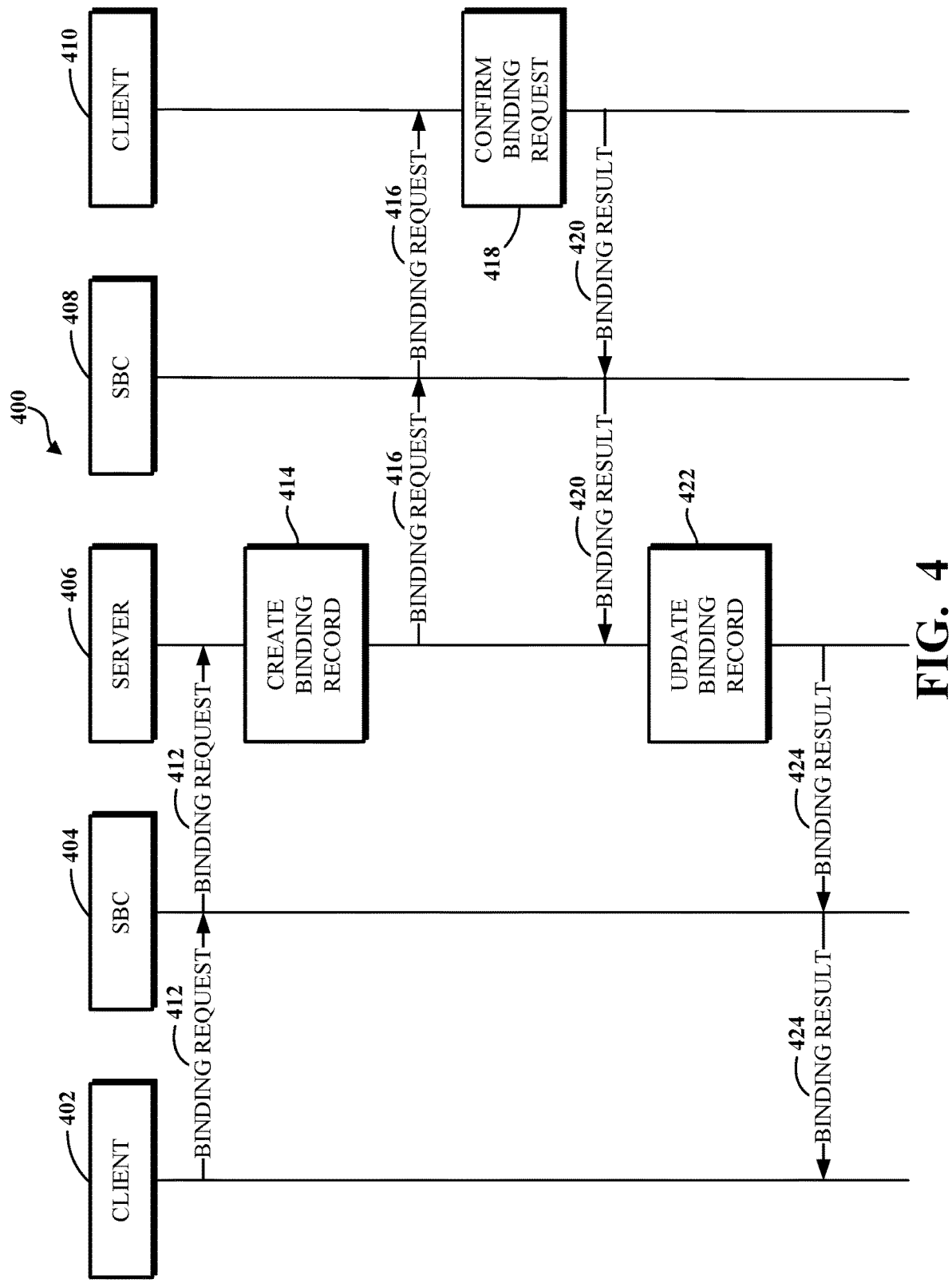
FIG. 4 is a swim lane diagram of an example of a system configured to perform a binding operation to enable a shared control mode for a client.

FIG. 4 is a swim lane diagram of an example of a system 400 configured to perform a binding operation to enable a shared control mode for a client. The system 400 includes a client 402, an SBC 404, a server 406, an SBC 408, and a client 410. The client 402 and the client 410 may each be a client application or a client device, such as any one of the clients 304 through 310 shown in FIG. 3. The server 406 may include one or more of the servers 108 through 112 shown in FIG. 1.

To enable the shared control mode, the system 400 performs a binding operation to wirelessly bind the client 402 to the client 410. In this example, the client 402 may be a controller device and the client 410 may be a controlled device such that the client 402 can control one or more functions of the client 410. The wireless binding is an association between the client 402 and the client 410 based on a user account or user extension where there is no direct wired connection between the client 402 and the client 410. For example, the client 402 and the client 410 may be wirelessly bound when they are both logged into the same user account or share the same user extension. The binding may enable a shared (e.g., bi-directional) control such that the client 402 can control one or more functions of the client 410 and the client 410 can control one or more functions of the client 402. In some cases, the one or more functions of the client 410 which can be controlled by the client 402 may be the same as the one or more functions of the client 402 which can be controlled by the client 410. In other cases, the one or more functions of the client 410 which can be controlled by the client 402 may be different from the one or more functions of the client 402 which can be controlled by the client 410.

As shown in FIG. 4, the client 402 is configured to transmit a binding request 412, which is or otherwise includes a request to create an association between client 402 and client 410 without a direct wired connection between client 402 and client 410. The binding request 412 may be included in a header of a SIP message, such as a SIP INFO message. For example, the SIP message may be an out-of-dialog SIP INFO message. The header of the SIP message may also include a request identifier (ID), an action command, a controller device ID, a controlled device ID, a controller application ID, a controlled application ID, an account ID, an extension ID, an extension domain, a manufacturer name, a timestamp, or any combination thereof. The request ID may be an alpha-numeric string that is used to identify the binding request. The action command may be an instruction or a command to perform an action associated with a function of another client or client device. The controller device ID may be an address or an alpha-numeric string that is used to identify the client device that is transmitting the action command to control a function of another client or client device. The controlled device ID may be an address or an alpha-numeric string that is used to identify the client device to be controlled by another client or client device. The controller application ID may be an address or an alpha-numeric string that is used to identify the client application that is transmitting the action command to control a function of another client or client device. The controlled application ID may be an address or an alpha-numeric string that is used to identify the client application to be controlled by another client or client device. The account ID may be an alpha-numeric string associated with a registration name of a user account. The extension ID may be a numeric representation of a telephony extension associated with the user account. The extension domain may be a domain name associated with the telephony extension. The manufacturer name may be the name of the manufacturer of the device transmitting the binding request. The timestamp may be an indication of the time that the binding request was transmitted.

The SBC 404 is configured to receive the binding request 412 and forward the binding request 412 to the server 406. The server 406 receives the binding request 412 and creates 414 a binding record in a database to indicate that a binding status between the client 402 and the client 410 is pending. The pending binding status indicates that the binding request 412 has been received, and the binding between the client 402 and the client 410 is not yet complete. Once the binding between the client 402 and the client 410 is completed, the binding status may be updated to indicate that the binding is active or connected. The binding record is created in response to receiving the binding request. The binding record may include the request ID, the controller device ID, the controlled device ID, the controller application ID, the controlled application ID, the account ID, the extension ID, the binding status, an extension domain, a registration name, a manufacturer name, a timestamp, or any combination thereof.

The server 406 transmits the binding request 416 to the SBC 408. The binding request 416 may be included in a header of a SIP message, such as a SIP NOTIFY message. For example, the SIP message may be an out-of-dialog SIP NOTIFY message. The SBC 408 receives the binding request 416 and forwards the binding request 416 to the client 410. The client 410 receives the binding request 416 and confirms 418 the binding request 416. Confirming the binding request 416 may include matching an account ID or extension ID included in the SIP message with an account ID or extension ID of the client 410. In some examples, receiving the binding request 416 may cause the client 410 to display a prompt on a display of the client 410 or some other device. The prompt may request an input to confirm the binding. The input may be received via a user interface of the client 410 or some other device, such as user interface 212 shown in FIG. 2.

When the binding request 416 is confirmed, the client 410 transmits a binding result 420 to the SBC 408. The binding result 420 may be included in a header of a SIP message, such as a SIP NOTIFY message. For example, the SIP message may be an out-of-dialog SIP NOTIFY message. The header of the SIP message may also include the request ID, a controller device ID, a controlled device ID, a controller application ID, a controlled application ID, an account ID, an extension ID, an extension domain, a manufacturer name, a timestamp, or any combination thereof. The SBC 408 receives the binding result 420 and forwards the binding result 420 to the server 406. The server 406 receives the binding result 420 and updates 422 the binding record to indicate that the binding status is confirmed. The server 406 transmits the binding result 424 to the SBC 404. The binding result 424 may be included in a header of a SIP message, such as a SIP INFO message. For example, the SIP message may be an out-of-dialog SIP INFO message. The SBC 404 receives the binding result 424 and forwards the binding result 424 to the client 402. In some examples, the client 402 may transmit a message to the SBC 404 to confirm that the client 402 received the binding result 424. The SBC 404 may transmit the message to the server 404. The server 404 may update the binding record to indicate that the binding is active or connected.

Figure 5:
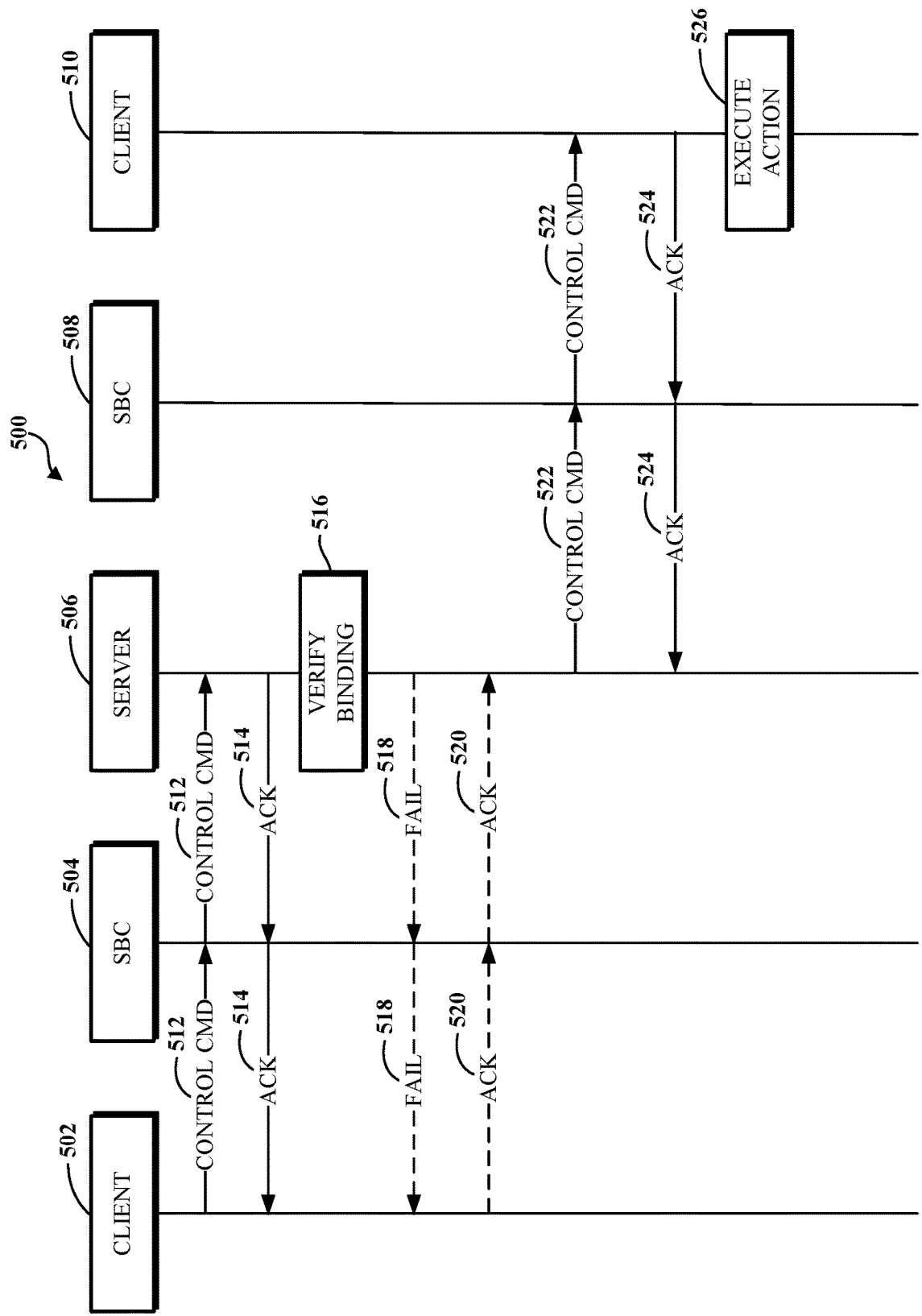
FIG. 5 is a swim lane diagram of an example of a system for controlling a remote client.

FIG. 5 is a swim lane diagram of an example of a system 500 for controlling a remote client. The system 500 includes a client 502, an SBC 504, a server 506, an SBC 508, and a client 510. The client 502 and the client 510 may each be a client application or a client device, such as clients 402 and 410 shown in FIG. 4. The server 506 may include one or more of the servers 108 through 112 shown in FIG. 1. For example, the server 506 may be the server 406 shown in FIG. 4.

In this example, the client 502 may be the controller device and the client 510 may be the controlled device. The client 502 is configured to transmit a control command 512 to control a function of the client 510. The control command 512 may be included in a header of a SIP message, such as a SIP INFO message. For example, the SIP message may be an out-of-dialog SIP INFO message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof. The SBC 504 is configured to receive the control command 512 and forward the control command 512 to the server 506. The server 506 receives the control command 512 and transmits an acknowledgement (ACK) 514 to the SBC 504 to indicate that the server 506 received the control command 512. The SBC 504 receives the ACK 514 and forwards the ACK 514 to the client 502.

In response to receiving the control command 512, the server 506 obtains a binding record from a database to verify 516 the binding status between the client 502 and the client 510. If the binding record indicates that a binding does not exist between the client 502 and the client 510, the server 506 may transmit a failure indication 518 to the SBC 504 that indicates that the execution of the control command 512 has failed. The failure indication 518 may be included in a header of a SIP message, such as a SIP INFO message. For example, the SIP message may be an out-of-dialog SIP INFO message. The SBC 504 receives the failure indication 518 and forwards the failure indication 518 to the client 502. The client 502 may receive the failure indication 518 and transmit an ACK 520 to the SBC 504. The SBC 504 may receive the ACK 520 and forward the ACK 520 to the server 506.

If the binding record indicates that a binding exists between the client 502 and the client 510, the server 506 transmits the control command 522 to the SBC 508. The control command 522 may be included in a header of a SIP message, such as a SIP NOTIFY message. For example, the SIP message may be an out-of-dialog SIP NOTIFY message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof. The SBC 508 receives the control command 522 and forwards the control command 522 to the client 510. The client 510 receives the control command 522 and transmits an ACK 524 to the SBC 508 to indicate that the client 510 has received the control command 522. The SBC 508 receives the ACK 524 and forwards the ACK 524 to the server 506.

In response to receiving the control command 522, the client 510 may execute 526 an action. The action may be executed based on an action command indicated in the control command 522. The action may include, and is not limited to, initiating a call, performing a call transfer, adding a call, merging a call, placing a call on hold, controlling the volume of the client 510, or muting a microphone of the client 510.

If the client 510 fails to execute the action, the client may transmit a failure indication to the SBC 508. The failure indication may be included in a header of a SIP message, such as a SIP INFO message. For example, the SIP message may be an out-of-dialog SIP INFO message. The SBC 508 receives the failure indication and forwards it to the server 506. The server 506 may receive the failure indication and transmit an ACK to the SBC 508. The SBC 508 may receive the ACK and forward the ACK to the client 510. In response to receiving the failure indication, the server 506 may delete the binding record in the database and transmit the failure indication to the SBC 504. The failure indication may be included in a header of a SIP message, for example, a SIP INFO message. The SIP INFO message may be an out-of-dialog SIP INFO message. The header may include a request for the client 502 to re-bind client 510. The SBC 504 receives the failure indication and forwards it to the client 502. The client 502 receives the failure indication and transmits an ACK to the SBC 504. The SBC 504 receives the ACK and forwards it to the server 506.

Figure 6:
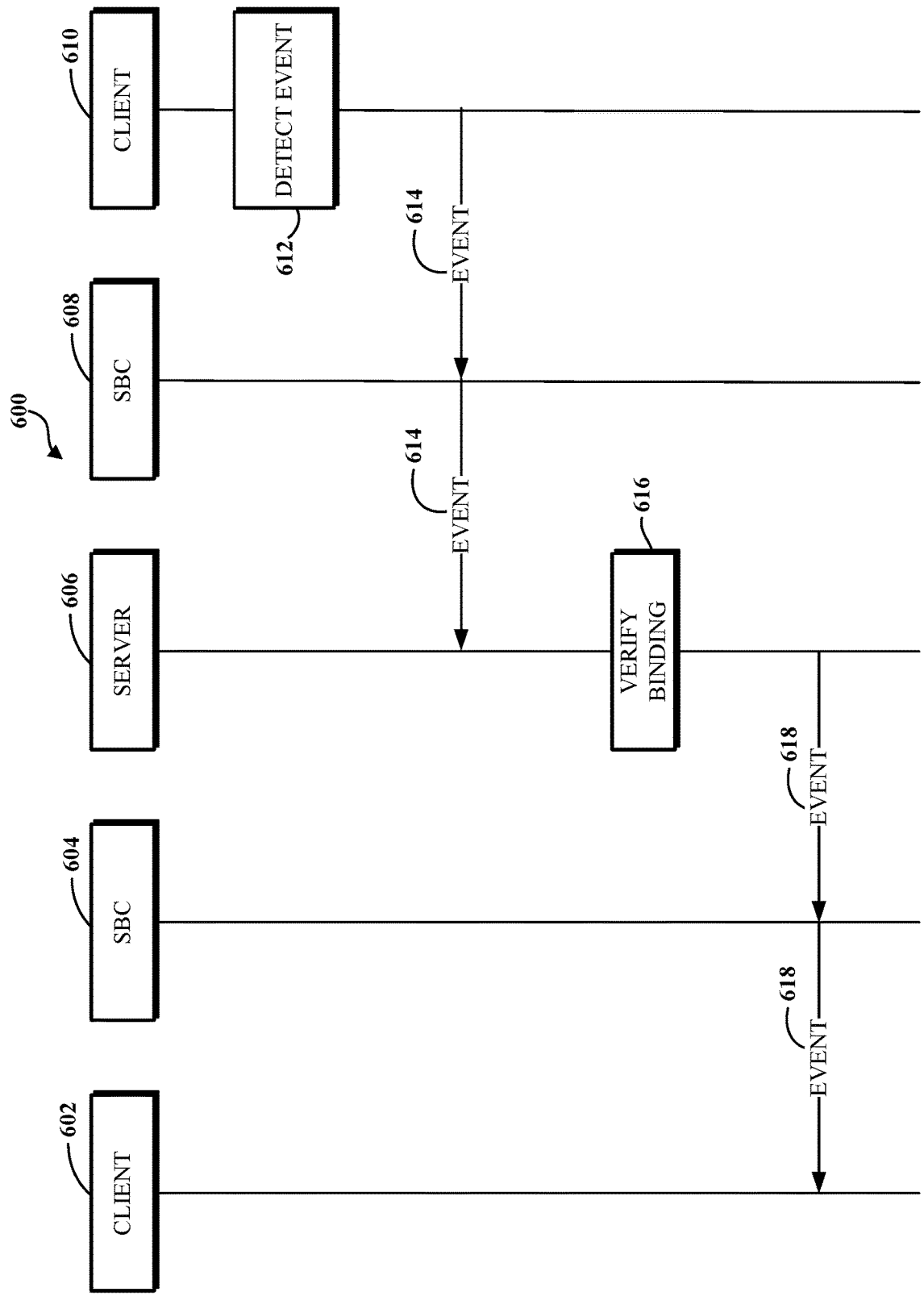
FIG. 6 is a swim lane diagram of an example of a system for shared control of a client.

FIG. 6 is a swim lane diagram of an example of a system 600 for shared control of a client. The system 600 includes a client 602, an SBC 604, a server 606, an SBC 608, and a client 610. The client 602 and the client 610 may each be a client application or a client device, such as clients 402 and 410 shown in FIG. 4 or the clients 502 and 510 shown in FIG. 5, to the extent different. The server 506 may include one or more of the servers 108 through 112 shown in FIG. 1. For example, the server 606 may be the server 506 shown in FIG. 5 or the server 406 shown in FIG. 4, to the extent different.

In this example, the client 602 may be the controller device and the client 610 may be the controlled device. At some point, the client 610 detects 612 an event. The event may be a call state change, such as a ring, a call connection, or a call termination. The client 610 transmits an event notification 614 to the SBC 608 to notify the client 602 of the detected event. The event notification 614 may be included in a header of a SIP message, such as a SIP INFO message. For example, the SIP message may be an out-of-dialog SIP INFO message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof. The SBC 608 receives the event notification 614 and forwards the event notification 614 to the server 606.

In response to receiving the event notification 614, the server 606 obtains a binding record from a database to verify 616 the binding status between the client 602 and the client 610. If the binding record indicates that a binding exists between the client 602 and the client 610, the server 606 transmits the event notification 618 to the SBC 604. The event notification 618 may be included in a header of a SIP message, such as a SIP INFO message. For example, the SIP message may be an out-of-dialog SIP INFO message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof. The SBC 604 receives the event notification 618 and forwards the event notification 618 to the client 602. In some examples, the client 602 may transmit an ACK to the SBC 604 to indicate that the client 602 has received the event notification 618. The SBC 604 may receive the ACK and forward it to the server 606.

Figure 7:
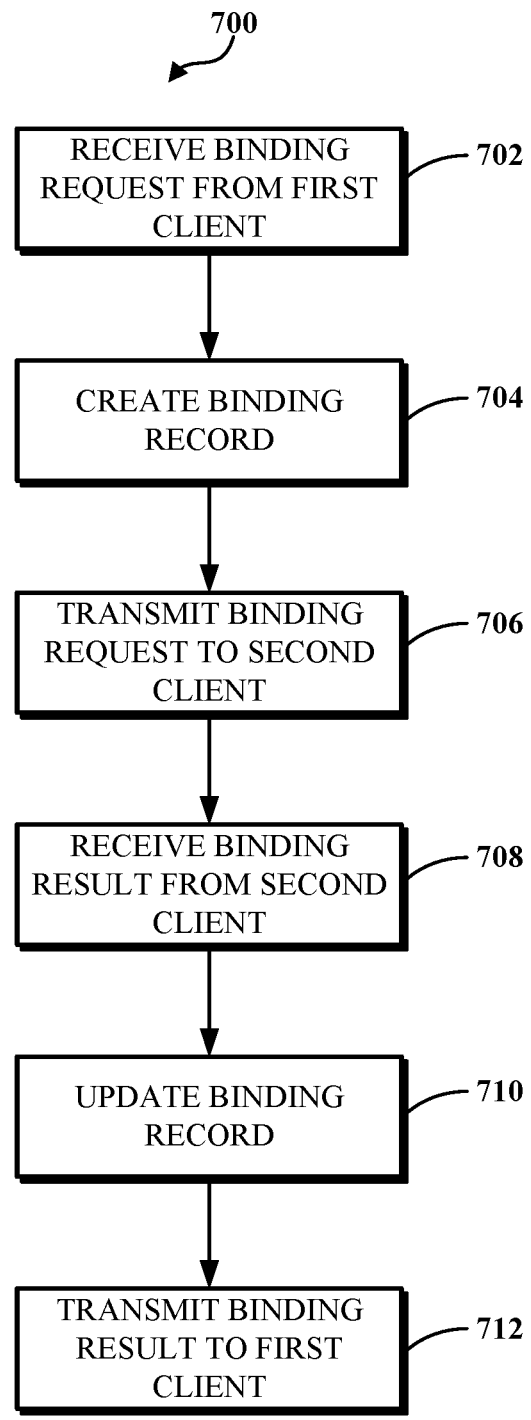
FIG. 7 is a flow diagram of an example of a method for performing a binding operation.
Figure 8:
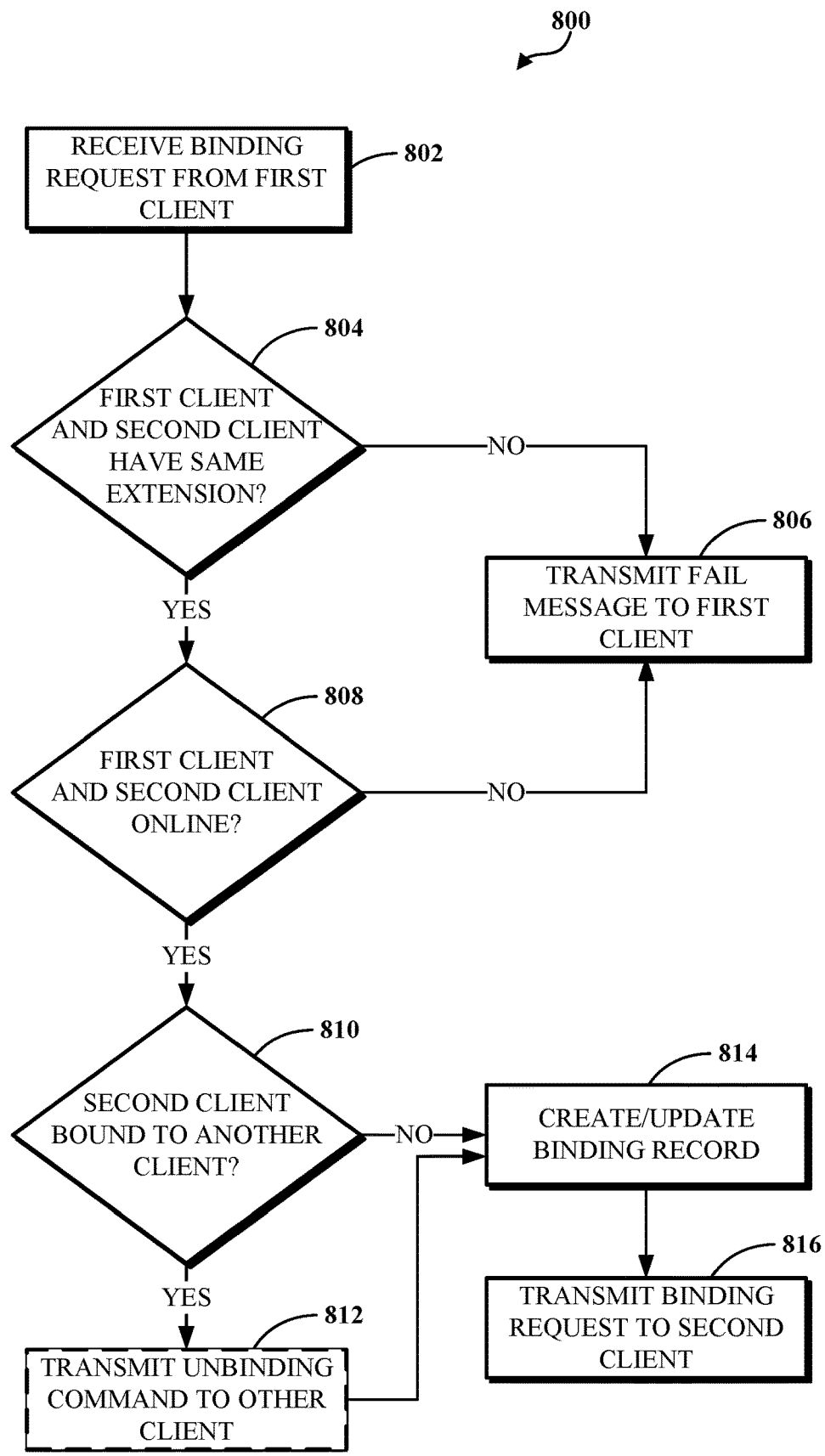
FIG. 8 is a flow diagram of another example of a method for performing a binding operation.
Figure 9:
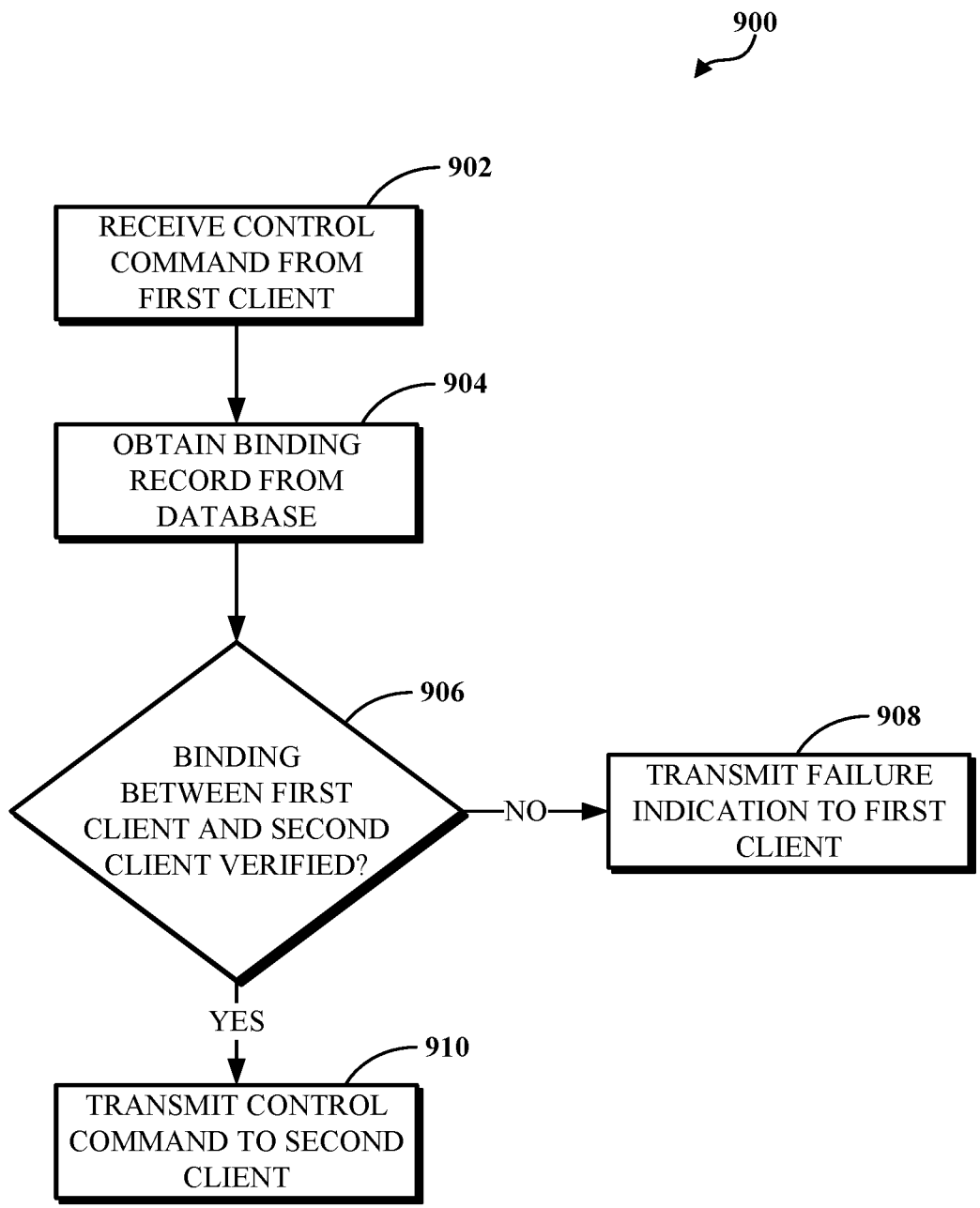
FIG. 9 is a flow diagram of an example of a method for controlling a remote client.

To further describe some implementations in greater detail, reference is next made to examples of techniques which may be performed by or using a system for shared control of a remote client. FIGS. 7-9 are flowcharts of examples methods for shared control of a remote client. The methods can be executed using computing devices, such as the systems, hardware, and software described with respect to FIGS. 1-6. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 is a flow diagram of an example of a method 700 for performing a binding operation. At 702, the method 700 includes receiving a binding request from a first client. In some examples, the binding request may be received via an SBC. In this example, the first client may be a controller device attempting to form a binding with a second client to control one or more functions of the second client. The binding request may be included in a header of a SIP message, such as a SIP INFO message. For example, the SIP message may be an out-of-dialog SIP INFO message. The header of the SIP message may also include a request ID, an action command, a controller device ID, a controlled device ID, a controller application ID, a controlled application ID, an account ID, an extension ID, an extension domain, a manufacturer name, a timestamp, or any combination thereof.

At 704, the method 700 includes creating a binding record. Creating the binding record includes storing the binding record in a database. The database may be an in-memory data structure store, such as a redis database. The binding record indicates a binding status between the first client and the second client and may include the request ID, the controller device ID, the controlled device ID, the controller application ID, the controlled application ID, the account ID, the extension ID, the binding status, an extension domain, a registration name, a manufacturer name, a timestamp, or any combination thereof. In this example, at this stage, the binding status may be indicated as pending.

At 706, the method 700 includes transmitting the binding request to the second client. In some examples, the binding request may be transmitted to the second client via an SBC. The binding request may be included in a header of a SIP message, such as a SIP NOTIFY message. For example, the SIP message may be an out-of-dialog SIP NOTIFY message.

At 708, the method 700 includes receiving a binding result from the second client. In some examples, the binding result may be received via an SBC. The binding result may be included in a header of a SIP message, such as a SIP NOTIFY message. For example, the SIP message may be an out-of-dialog SIP NOTIFY message. The header of the SIP message may also include the request ID, a controller device ID, a controlled device ID, a controller application ID, a controlled application ID, an account ID, an extension ID, an extension domain, a manufacturer name, a timestamp, or any combination thereof.

At 710, the method 700 includes updating the binding record. For example, the binding record may be updated to indicate that the binding status is confirmed or connected. In an example where the binding operation failed, the binding record may be updated to indicate the binding status as failed.

At 712, the method 700 includes transmitting the binding result to the first client to notify the first client of the binding status. In some examples, the binding result may be transmitted via an SBC. The binding result may be included in a header of a SIP message, such as a SIP INFO message. For example, the SIP message may be an out-of-dialog SIP INFO message.

In some implementations, a binding may be created between the first client and the second client when the first client and the second client do not share the same extension. For example, the first client may be a mobile device, such as a mobile phone, tablet computing device, or laptop computing device, and the second client may be a conference room phone, such as an IP phone that is associated with the conference room. In this example, a binding may be created between the first client and the second client via an application. The application may be running on the first client or the second client. In an example where the application is running on the first client, the binding may be created by entering or scanning a device-specific code associated with the second client. Entering or scanning the device-specific code using the first client may trigger the transmission of the binding request by the first client. In an example where the application is running on the second client, the binding may be created by entering or scanning a device-specific code associated with the first client. In some examples, an application running on the first device may display a device-specific code. The device-specific code may be entered or scanned using the second client, which in turn may trigger the transmission of the binding request by the second client.

FIG. 8 is a flow diagram of another example of a method 800 for performing a binding operation. At 802, the method 800 includes receiving a binding request from a first client. In some examples, the binding request may be received via an SBC. In this example, the first client may be a controller device attempting to form a binding with a second client to control one or more functions of the second client. The binding request may be included in a header of a SIP message, such as a SIP INFO message. For example, the SIP message may be an out-of-dialog SIP INFO message. The header of the SIP message may also include a request ID, an action command, a controller device ID, a controlled device ID, a controller application ID, a controlled application ID, an account ID, an extension ID, an extension domain, a manufacturer name, a timestamp, or any combination thereof.

At 804, the method 800 includes determining whether the first client share the same extension. Determining whether the first client and the second client share the same extension may include determining whether the first client and the second client are associated with the same user account. If it is determined that the first client and the second client do not share the same extension, at 806, the method 800 includes transmitting a fail message to the first client. In some examples, the fail message may be transmitted via an SBC.

If it is determined at 804 that the first client and the second client share the same extension, the method 800 includes determining whether the first client and the second client are online at 808. If it is determined at 808 that the first client and the second client are not online, the method 800 includes transmitting a fail message to the first client at 806. In some examples, the fail message may be transmitted via an SBC.

If it is determined at 804 that the first client and the second client are online, the method 800 includes determining whether the second client is bound to another client at 810. If it is determined at 810 that the second client is bound to another client, in some examples, the method 800 may include transmitting an unbinding command to the other client at 812 to remove the binding between the second client and the other client. At 814, the method 800 includes creating or updating a binding record. At 816, the method 800 includes transmitting the binding request to the second client. In some examples, the binding request may be transmitted via an SBC. The binding request may be included in a header of a SIP message, such as a SIP NOTIFY message. For example, the SIP message may be an out-of-dialog SIP NOTIFY message. The method 800 may continue with similar operations as those shown in operations 708-712 in FIG. 7.

If it is determined at 810 that the second client is not bound to another client, the method 800 includes creating or updating a binding record at 814. At 816, the method 800 includes transmitting the binding request to the second client. In some examples, the binding request may be transmitted via an SBC. The binding request may be included in a header of a SIP message, such as a SIP NOTIFY message. For example, the SIP message may be an out-of-dialog SIP NOTIFY message. The method 800 may continue with similar operations as those shown in operations 708-712 in FIG. 7.

In some implementations, a binding may be created between the first client and the second client when the first client and the second client are not associated with the same user account. For example, the first client may be a mobile device, such as a mobile phone, tablet computing device, or laptop computing device, and the second client may be a shared phone, such as an IP phone that is associated with a particular workstation in a shared working environment, such as a hotdesking environment where multiple users use a single workstation during different time periods. In this example, a binding may be created between the first client and the second client via an application. The application may be running on the first client or the second client. In an example where the application is running on the first client, the binding may be created by entering or scanning a device-specific code associated with the second client. Entering or scanning the device-specific code using the first client may trigger the transmission of the binding request by the first client. In an example where the application is running on the second client, the binding may be created by entering or scanning a device-specific code associated with the first client. In some examples, an application running on the first device may display a device-specific code. The device-specific code may be entered or scanned using the second client, which in turn may trigger the transmission of the binding request by the second client.

FIG. 9 is a flow diagram of an example of a method 900 for controlling a remote client from a first client. For clarity, the remote client will be referred to as the second client. At 902, the method 900 includes receiving a control command from the first client. In some examples, the control command may be received via an SBC. The control command 512 may be included in a header of a SIP message, such as a SIP INFO message. For example, the SIP message may be an out-of-dialog SIP INFO message. The header of the SIP message may also include a command ID, an action command, a controller device ID, a controlled device ID, a controller application ID, a controlled application ID, an account ID, an extension ID, an extension domain, a registration name, a manufacturer name, a timestamp, or any combination thereof.

At 904, the method 900 includes obtaining a binding record from a database to verify the binding status between the first client and the second client. If it is determined at 906 that a binding cannot be verified, and therefore a binding does not exist between the first client and the second client, the method 900 includes transmitting a failure indication to the first client at 908. The failure indication indicates that the execution of the control command has failed. The failure indication may be included in a header of a SIP message, such as a SIP INFO message. For example, the SIP message may be an out-of-dialog SIP INFO message. In some examples, the failure indication may be transmitted via an SBC.

If it is determined at 906 that a binding is verified, and therefore a binding between the first client and second client exists, the method 900 includes transmitting the control command to the second client at 910. In some examples, the control command may be transmitted via an SBC. The control command may be included in a header of a SIP message, for example, a SIP NOTIFY message. The SIP NOTIFY message may be an out-of-dialog SIP NOTIFY message.

In some implementations, a shared control mode can be used to enable bi-directional control of clients across the software platform. Bi-directional control of clients may be enabled by creating a binding between clients across the software platform. In an example where a binding has been created between a computer and a desk phone, the computer may be used to change a setting on the desk phone, such as a ringtone or a background image, for example. In this example, the binding may also enable the computer to be used as an audio source for a conference. Shared control mode can be used to enable bi-directional control such that the volume buttons on the desk phone may be used to control the volume of the speakers of the computer. In shared control mode, the client that acts as a controller transmits the control command. In this example, the computer may transmit a control command to change the desk phone setting, and the desk phone may transmit a control command in response to a button press to adjust the volume of the speakers of the computer.

In an example webinar implementation, a client may be enabled to control one or more functions of a camera, such as a zoom function, a pan/tilt function, or an exposure setting. In this example, a binding may be created between the client and the camera. To control the camera, the client may transmit a control command based on a received input. The input may be received via a user interface of the client. The input may be a touch input, a voice input, a gesture input, or a text input.

In an example hybrid conference implementation where some conference participants are meeting in person, and some participants are attending the conference virtually, a virtual attendee may control a device in the conference room using shared control mode. The device may be a robotic arm or a printer that is configured to draw on a physical whiteboard in the conference room. In this example, the virtual attendee may use a tablet computer or some other input device to control the device in the conference room. A binding may be created between the tablet computer and the device in the conference room. To control the device in the conference room, the tablet computer may transmit a control command based on a received input. In this example, the input may be received via a touch interface of the tablet computer.

Some implementations may include a method that includes receiving a control command from a first client associated with a user account. The method may include determining a binding status of the first client to a second client. The second client may be associated with the user account. The first client may be wirelessly connected to the second client. The control command may indicate a function to be performed by the second client. The method may include transmitting the control command to the second client to perform the function when the binding status indicates a binding between the first client and the second client. In one or more implementations, the method may include receiving an indication of a call status change from the second client. In one or more implementations, the method may include obtaining a binding status from a database responsive to the indication. In one or more implementations, the method may include transmitting the indication to the first client when the binding status indicates the binding between the first client and the second client. In one or more implementations, the control command may include a header. In one or more implementations, the header may include an action command associated with the function of the second client. In one or more implementations, the control command may include a header that includes a controller device identifier associated with the first client. In one or more implementations, the control command may include a header that includes a controlled device identifier associated with the second client. In one or more implementations, the control command may be a SIP message. In one or more implementations, the first client and the second client may have different extensions. In one or more implementations, the binding may be created using a code associated with the first client or the second client. In one or more implementations, the second client may have a less usable interface than the first client. In one or more implementations, the method may include initiating a call from the first client where the call is conducted via the second client. In one or more implementations, the second client may be a desk phone where the function to be performed by the desk phone is to change a ringtone or a background image of the desk phone.

Some implementations may include a non-transitory computer-readable storage device that includes program instructions. The program instructions may be executed by a processor that cause the processor to perform operations. The operations may include receiving a control command from a first client associated with a user account. The operations may include determining a binding status of the first client to a second client associated with the user account. The first client may be wirelessly connected to the second client. The control command may indicate a function to be performed by the second client. The operations may include transmitting the control command to the second client to perform the function when the binding status indicates a binding between the first client and the second client. In one or more implementations, the operations may include receiving an indication of a call status change from the second client. In one or more implementations, the operations may include obtaining the binding status from a database responsive to the indication. In one or more implementations, the operations may include transmitting the indication to the first client when the binding status indicates the binding between the first client and the second client. In one or more implementations, the control command may include a header. In one or more implementations, the header may include an action command associated with the function of the second client. In one or more implementations, the control command may include a header that includes a controller device identifier associated with the first client. In one or more implementations, the control command may include a header that includes a controlled device identifier associated with the second client. In one or more implementations, the control command may be a SIP message. In one or more implementations, the first client and the second client may have different extensions. In one or more implementations, the binding may be created using a code associated with the first client or the second client. In one or more implementations, the second client may have a less usable interface that the first client. In one or more implementations, the operations may include initiating a call from the first client where the call is conducted via the second client. In one or more implementations, the second client may be a desk phone where the function to be performed by the desk phone is to change a ringtone or a background image of the desk phone. In one or more implementations, the second client may be a camera where the function to be performed by the camera is to adjust a zoom function of the camera.

In some implementations, a system may include a first client, a second client, and a server. The server may be configured to receive a control command from the first client associated with a user account. The server may be configured to determine a binding status of the first client to the second client associated with the user account. The first client may be wirelessly connected to the second client. The control command may indicate a function to be performed by the second client. The server may be configured to transmit the control command to the second client to perform the function when the binding status indicates a binding between the first client and the second client. In one or more implementations, the server may be configured to receive a binding request from the first client. In one or more implementations, the server may be configured to create a binding record that indicates the binding status of the first client to the second client. In one or more implementations, the binding status may be indicated as pending. In one or more implementations, the server may be configured to receive a binding request from the first client that is an out-of-dialog SIP INFO message. In one or more implementations, the server may be configured to receive a binding result from the second client. In one or more implementations, the server may be configured to update a binding record to indicate an updated binding status based on the binding result. In one or more implementations, the server may be configured to update a binding record to indicate an updated binding status as connected. In one or more implementations, the server may be configured to receive a binding result that is an out-of-dialog SIP NOTIFY message.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving a control command from a computing device connected to a cloud-based communication system based on a telephony extension;
   obtaining, from a database, a binding status of the computing device to a voice over internet protocol (VOIP) phone connected to the cloud-based communication system based on the telephony extension, wherein the binding status indicates whether a wireless binding between the computing device and the VOIP phone is active, the control command indicating a function to be performed by the VOIP phone;
   enabling bi-directional control such that the computing device is enabled to control a function of the VOIP phone and the VOIP phone is enabled to control a function of the computing device, when the binding status indicates an active binding between the computing device and the VOIP phone; and
   transmitting the control command to the VOIP phone to perform the indicated function.

2. The method of claim 1, comprising:
   receiving an indication of a call status change from the VOIP phone;
   obtaining the binding status from a database responsive to the indication; and
   transmitting the indication to the computing device when the binding status indicates the binding between the computing device and the VOIP phone.

3. The method of claim 1, wherein the control command includes a header that includes an action command associated with the function of the VOIP phone, the control command includes a header that includes a controller device identifier associated with the computing device, the control command includes a header that includes a controlled device identifier associated with the VOIP phone, or the control command is a session initiation protocol (SIP) message.

4. The method of claim 1, wherein the computing device and the VOIP phone have different extensions, and wherein the binding is created using a code associated with the computing device or the VOIP phone.

5. The method of claim 1, wherein the VOIP phone has a less usable interface than the computing device, the method comprising:
   initiating a call from the computing device, wherein the call is conducted via the VOIP phone.

6. The method of claim 1, wherein the VOIP phone is a desk phone, and wherein the function to be performed by the desk phone is to change a ringtone or a background image of the desk phone.

7. A non-transitory computer-readable storage device including program instructions that, when executed by a processor, cause the processor to perform operations, the operations comprising:
   receiving a control command from a computing device connected to a cloud-based communication system based on a telephony extension;
   obtaining a binding status of the computing device to a voice over internet protocol (VOIP) phone connected to the cloud-based communication system based on the telephony extension, wherein the binding status indicates whether a wireless binding between the computing device and the VOIP phone is active, the control command indicating a function to be performed by the VOIP phone;
   enabling bi-directional control such that the computing device is enabled to control a function of the VOIP phone and the VOIP phone is enabled to control a function of the computing device, when the binding status indicates an active binding between the computing device and the VOIP phone; and
   transmitting the control command to the VOIP phone to perform the indicated function.

8. The non-transitory computer-readable storage device of claim 7, wherein the program instructions, when executed by the processor, cause the processor to perform operations, the operations comprising:

receiving an indication of a call status change from the VOIP phone;

obtaining the binding status from a database responsive to the indication; and transmitting the indication to the computing device when the binding status indicates the binding between the computing device and the VOIP phone.

9. The non-transitory computer-readable storage device of claim 7, wherein the control command includes a header that includes an action command associated with the function of the VOIP phone, the control command includes a header that includes a controller device identifier associated with the computing device, the control command includes a header that includes a controlled device identifier associated with the VOIP phone, the control command includes a header that includes an action command associated with a control function of multiple devices, or the control command is a session initiation protocol (SIP) message.

10. The non-transitory computer-readable storage device of claim 7, wherein the computing device and the VOIP phone have different extensions, and wherein the binding is created using a code associated with the computing device or the VOIP phone.

11. The non-transitory computer-readable storage device of claim 7, wherein the VOIP phone has a less usable interface than the computing device, and wherein the program instructions, when executed by the processor, cause the processor to perform operations, the operations comprising:

initiating a call from the computing device, wherein the call is conducted via the VOIP phone.

12. The non-transitory computer-readable storage device of claim 7, wherein the VOIP phone is a desk phone, and wherein the function to be performed by the desk phone is to change a ringtone or a background image of the desk phone.

13. The non-transitory computer-readable storage device of claim 7, wherein the VOIP phone is a camera, and wherein the function to be performed by the camera is to adjust a zoom function of the camera.

14. A cloud-based communication system, comprising:

a computing device connected to the cloud-based communication system based on a telephony extension;

a voice over internet protocol (VOIP) phone connected to the cloud-based communication system based on the telephony extension; and a server comprising a processor coupled to a memory, the server configured to:

receive a control command from the computing device;

obtain a binding status of the computing device to the VOIP phone from a database, wherein the binding status indicates whether a wireless binding between the computing device and the VOIP phone is active, the control command indicating a function to be performed by the VOIP phone;

enable bi-directional control such that the computing device is enabled to control a function of the VOIP phone and the VOIP phone is enabled to control a function of the computing device, when the binding status indicates an active binding between the computing device and the VOIP phone; and transmit the control command to the VOIP phone to perform the indicated function.

15. The cloud-based communication system of claim 14, wherein the server is configured to:

receive a binding request from the computing device; and create a binding record that indicates the binding status of the computing device to the VOIP phone.

16. The cloud-based communication system of claim 14, wherein the binding status is indicated as pending.

17. The cloud-based communication system of claim 14, wherein the server is configured to receive a binding request from the computing device that is an out-of-dialog session initiation protocol (SIP) INFO message.

18. The cloud-based communication system of claim 14, wherein the server is configured to:

receive a binding result from the VOIP phone; and update a binding record to indicate an updated binding status based on the binding result.

19. The cloud-based communication system of claim 14, wherein the server is configured to update a binding record to indicate an updated binding status as connected.

20. The cloud-based communication system of claim 14, wherein the server is configured to receive a binding result that is an out-of-dialog session initiation protocol (SIP) NOTIFY message.

* * * * *